(12) United States Patent
Germiquet et al.

(10) Patent No.: US 10,503,125 B2
(45) Date of Patent: Dec. 10, 2019

(54) WEARABLE DEVICE INCORPORATING A DEVICE FOR MEASURING AMBIENT TEMPERATURE

(71) Applicant: The Swatch Group Research and Development Ltd, Marin (CH)

(72) Inventors: Christophe Germiquet, Preles (CH); David Hoover, La Sarraz (CH)

(73) Assignee: The Swatch Group Research and Development Ltd, Marin (CH)

( * ) Notice: Subject to any disclaimer, the term of this patent is extended or adjusted under 35 U.S.C. 154(b) by 581 days.

(21) Appl. No.: 14/794,023

(22) Filed: Jul. 8, 2015

(65) Prior Publication Data
US 2016/0018791 A1    Jan. 21, 2016

(30) Foreign Application Priority Data
Jul. 15, 2014    (EP) .................................... 14176984

(51) Int. Cl.
*G01J 5/00* (2006.01)
*G04G 21/02* (2010.01)
(Continued)

(52) U.S. Cl.
CPC .............. *G04G 21/02* (2013.01); *G01J 5/025* (2013.01); *G01J 5/0205* (2013.01); *G01J 5/089* (2013.01);
(Continued)

(58) Field of Classification Search
CPC combination set(s) only.
See application file for complete search history.

(56) References Cited

U.S. PATENT DOCUMENTS 5,703,368 A * 12/1997 Tomooka ............... G08B 13/19
                                                      250/349
5,734,625 A *  3/1998 Kondo ............... A61B 5/02438
                                                      368/10
(Continued)

FOREIGN PATENT DOCUMENTS

EP          0 674 161 A1     9/1995
JP          2007-271413     10/2007

OTHER PUBLICATIONS

JP 2007271413 Translation.*
(Continued)

*Primary Examiner* — Lisa M Caputo
*Assistant Examiner* — Nasir U. Ahmed
(74) *Attorney, Agent, or Firm* — Oblon, McClelland, Maier & Neustadt, L.L.P.

(57) ABSTRACT

The wearable device incorporates a device for measuring the ambient temperature, which comprises an infrared sensor. In an ambient temperature measurement mode a control circuit activates the infrared sensor several times so that it can supply a plurality of measurement signals over a certain period of time. A circuit for processing measurement signals is then arranged in order to supply temperature values corresponding to at least a portion of the measurement signals and to take a mean for at least a portion of these temperature values to obtain an average temperature value that is considered to be representative of the ambient temperature. The invention also relates to a method for measuring the ambient temperature that can be implemented by means of this wearable device.

22 Claims, 3 Drawing Sheets

(51) Int. Cl.
*G01J 5/08* (2006.01)
*G01J 5/02* (2006.01)
*G01K 11/00* (2006.01)

(52) U.S. Cl.
CPC .......... *G01J 5/0831* (2013.01); *G01J 5/0862* (2013.01); *G01K 11/00* (2013.01)

(56) References Cited

U.S. PATENT DOCUMENTS

| | | | | |
|---|---|---|---|---|
| 5,860,740 | A * | 1/1999 | Fujima | G01J 5/02 368/11 |
| 2004/0022297 | A1* | 2/2004 | Tabata | G01J 5/02 374/120 |
| 2007/0174152 | A1* | 7/2007 | Bjornberg | G01C 15/00 705/28 |
| 2008/0319713 | A1* | 12/2008 | Resende | G06F 7/544 702/189 |
| 2010/0267361 | A1* | 10/2010 | Sullivan | G01S 19/17 455/404.2 |
| 2011/0222375 | A1 | 9/2011 | Tsubata et al. | |

OTHER PUBLICATIONS

European Search Report dated Apr. 20, 2015 in European Application 14176984, filed on Jul. 15, 2014 ( with English Translation).

\* cited by examiner

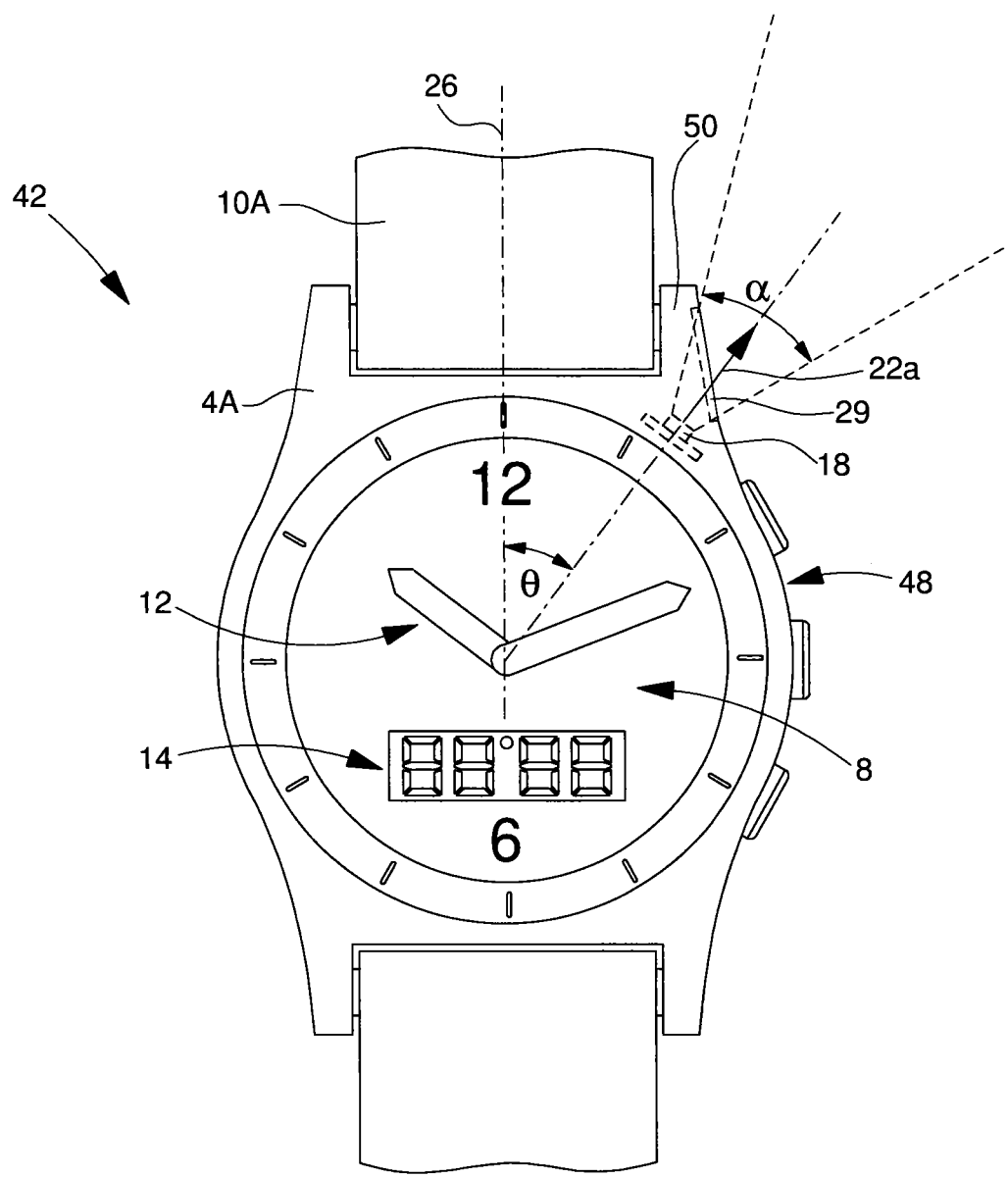

WEARABLE DEVICE INCORPORATING A DEVICE FOR MEASURING AMBIENT TEMPERATURE

This application claims priority from European Patent Application No. EP14176984.4 filed Jul. 15, 2014, the entire disclosure of which is hereby incorporated herein by reference.

TECHNICAL FIELD

The present invention relates to the field of wearable devices incorporating a temperature measurement device, also called a thermometer, arranged to measure the ambient temperature. In particular, the invention relates to devices that can be worn on a wrist of a user, e.g. a wristwatch fitted with such a thermometer.

TECHNOLOGICAL BACKGROUND

Wearable devices, in particular wristwatches, fitted with a thermometer have been proposed, since display of the ambient temperature is useful information appreciated by many users. In general, the temperature sensors used are resistive-type sensors or are formed by a thermocouple. Such sensors indicate the temperature of their direct surroundings. In the case of a wristwatch in particular, it is the temperature prevailing in the watch case that is measured when the thermometer is arranged in this case. However, the human body is a source of energy that generally has a substantial influence on the temperature inside the case when the wristwatch is worn on the wrist. Hence, it is difficult, if not impossible, to measure the ambient temperature precisely when the wristwatch is worn on the wrist. In fact, it must be removed and placed on a non-heating support, and then it is necessary to wait a relatively long period of time until the temperature of the watch is close to ambient temperature to finally perform a measurement of the ambient temperature. This situation is highly inconvenient for the user, which makes this temperature measurement function of little appeal in a wearable object, in particular in a watch. Some configurations seek to move the sensor the maximum distance away from the wrist and/or to thermally insulate it from parts in direct contact with the human body. However, these solutions are technically complex and difficult to implement in a wristwatch.

SUMMARY OF THE INVENTION

The aim of the present invention is to provide a device that is wearable, in particular on the wrist of a user, and incorporates a thermometer that enables a correct measurement of the ambient temperature to be supplied while avoiding the body temperature of the wearer.

To this end, the present invention relates to a wearable device incorporating a temperature measurement device arranged to measure the ambient temperature, this measurement device comprising an infrared sensor (IR sensor), a control circuit for the infrared sensor and a circuit for processing measurement signals supplied by the infrared sensor, wherein in an ambient temperature measurement mode this infrared sensor is arranged to be able to receive an infrared radiation from outside this wearable device. In an ambient temperature measurement mode the control circuit is arranged to be able to activate the infrared sensor several times so that it can supply a plurality of measurement signals of the infrared radiation from outside this wearable device over a certain period of time. In this ambient temperature measurement mode the processing circuit is arranged to supply temperature values corresponding to at least a portion of the plurality of measurement signals and to take a mean for at least a portion of these temperature values to obtain an average temperature value that is considered to be representative of the ambient temperature.

The invention is based on the following finding of the inventors: the temperature of an internal space generally corresponds sufficiently exactly to a mean of the temperatures of the surfaces delimiting this space and objects located in this space. This is particularly true when this space has been in a stable state thermally for a certain period of time in view of the thermal inertia of the various materials present. The present invention thus uses an infrared sensor that allows temperature measurements of the material located in the surrounding area of the user to be obtained that are independent of the temperature of the user. This infrared sensor is incorporated into a wearable device that can be subjected to various movements when worn. When the sensor is not covered, it is thus possible to obtain several measurements corresponding to various orientations of the infrared sensor over a certain period. The mean value of these measurements corresponds substantially to the ambient temperature. The inventors then observed that measurements on the outside often did not give correct results by simply applying this general method appropriate for a closed space. The preferred embodiment mentioned below gives an effective solution for outside.

According to a preferred embodiment the wearable device comprises an inclinometer, which is arranged to measure an angle between a terrestrial reference direction and an orientation direction of the infrared sensor. In the ambient temperature measurement mode either the control circuit is arranged to activate the infrared sensor only when the orientation direction is located in an certain angular space, or the processing circuit is arranged to exclude a measurement signal received from the infrared sensor when the orientation direction thereof is located outside this angular space.

In a particular variant the terrestrial reference direction is a vertical axis and the orientation direction is defined by a vector normal to the active surface of the infrared sensor. Said angular space is then defined by a right circular cone that has this vertical axis as centre axis, its vertex being located at the top of this cone. Thus, for a temperature measurement on the outside the temperature measurements are stopped or these measurements are eliminated when the infrared sensor is oriented in the direction of the sky, since the infrared radiation coming from the sky generally gives a very low temperature that does not correspond in any way to the ambient temperature. As a result of the inclinometer only the temperature measures that correspond to the orientations of the infrared sensor towards surfaces in the surrounding area of the wearable device can be selected.

The invention also relates to a method for measuring the ambient temperature by means of an infrared sensor incorporated into a wearable device, wherein this method is defined in claim 12.

Other particular features of the invention are the subject of dependent claims and will be explained below in the detailed description of the invention.

BRIEF DESCRIPTION OF THE DRAWINGS

The invention shall be described below with the aid of attached drawings given as examples that are in no way restrictive:

FIG. 3 is a plan view of another embodiment of a wristwatch according to the invention.

DETAILED DESCRIPTION OF THE INVENTION

Figure 1:
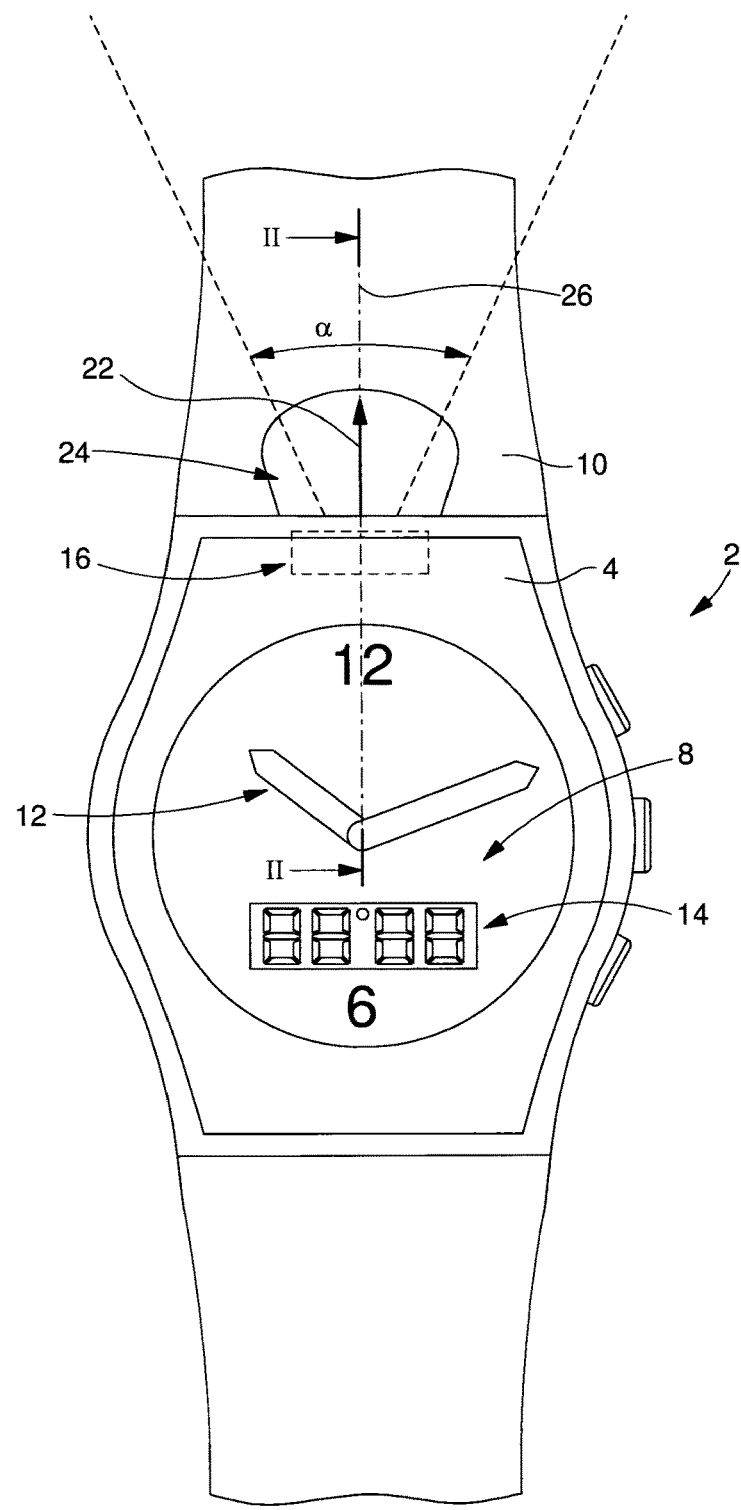
FIG. 1 is a plan view onto a wristwatch according to the invention.
Figure 2:
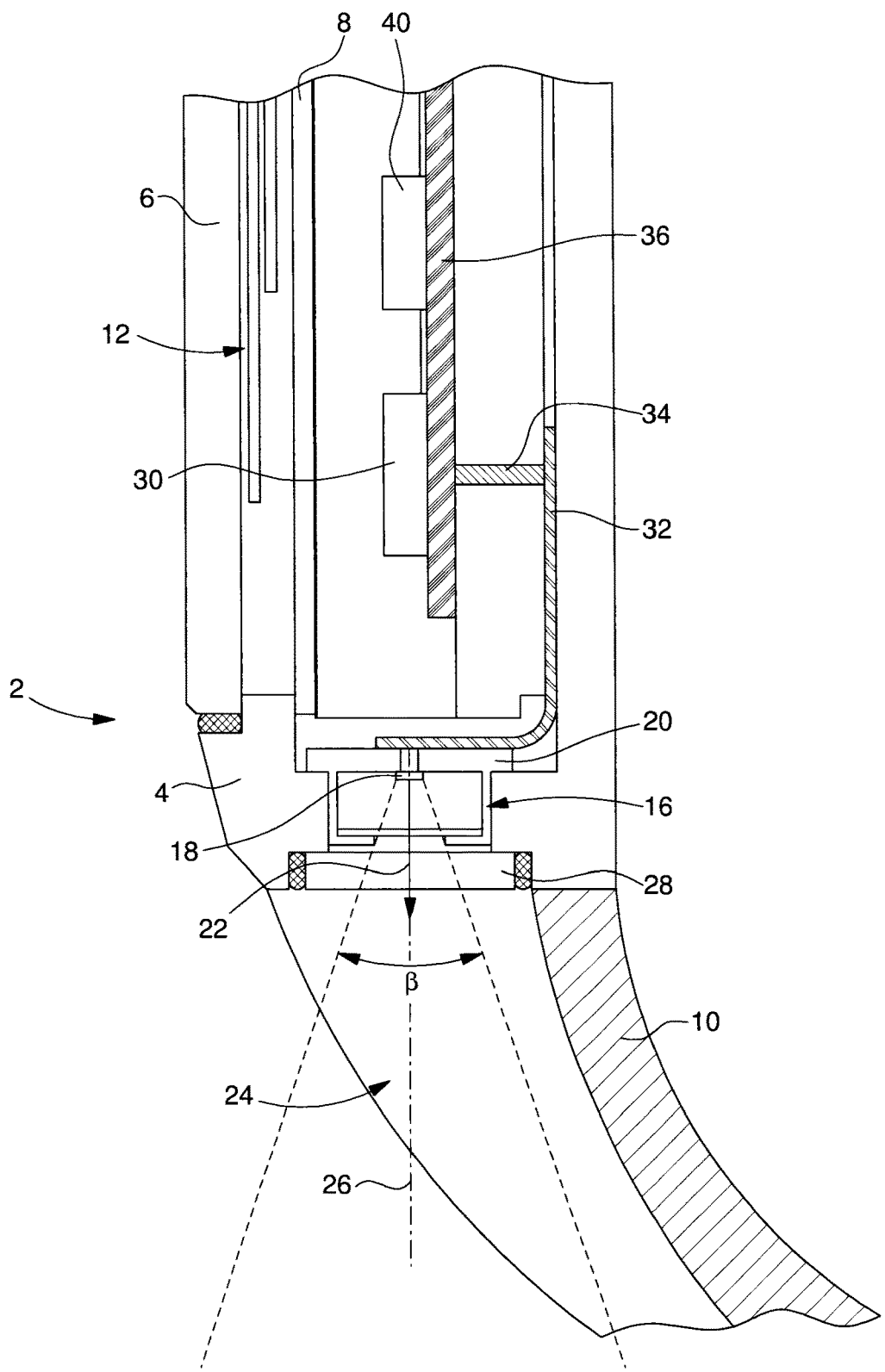
FIG. 2 is a view in partial section of FIG. 1.

A general embodiment of a wearable device 2 according to the invention incorporating a temperature measurement device arranged to measure the ambient temperature will firstly be described on the basis of FIGS. 1 and 2. In the embodiment shown in the figures this wearable device is a wristwatch comprising a case 4, a watch glass 6, a dial 8 and a watch band 10. It also comprises an analog display 12 and a digital display 14. The digital display is provided in particular to display a measurement of the ambient temperature. However, in a variant it is provided that the analog display is used to indicate the ambient temperature using one of the hands as indicator and an associated temperature scale on the dial 8 so that the digital display is not necessary for indication of the ambient temperature.

The temperature measurement device comprises an infrared sensor 18 arranged in a unit 16 for measuring the surrounding infrared radiation. This unit is formed by a small box 20, on an inside wall of which the infrared sensor is arranged, the wall facing the active surface of this sensor being formed by a lug that is transparent to infrared radiation (IR radiation). Thus, the infrared sensor is arranged to be able to receive an infrared radiation from outside the wearable device, into which the measurement device is incorporated. The box 20 is housed in a lateral recess of the case 4. More particularly, in the variant shown in FIGS. 1 and 2, the lateral recess of the case is provided in such a manner that the infrared sensor 18 is arranged with the vector 22 normal to its active surface largely located in a plane (corresponding to the cutting plane of FIG. 2) comprising the '6 h-12 h' axis 26 of the watch and perpendicular to the general plane (plane of the dial 8) of the case 4. The abovementioned normal vector is oriented in the '12 h' direction relative to the centre of the case and can have an angular displacement relative to said axis 26 that is less than thirty degrees (30°) in the angular direction moving away from the watch band 10. In the example of FIG. 2 there is no angular displacement and the normal vector is thus parallel to the axis 26. Since the sensor is provided in a region where the watch band is attached to the case, a recess 24 is provided in the centre of the watch band on the side of the case 4. To guarantee a tight closure of the case 4 and protection of the measurement unit 16, a locking disc 28 is provided on the external side in front of this measurement unit. This disc is mounted to be sealed either by means of a classic sealing strip or by another method known to the person skilled in the art, e.g. by gluing. This disc is designed to be substantially transparent to infrared radiation. For example, it is formed from a crystal of germanium, which has a metallic appearance and is therefore essentially opaque in the visible range.

It will be noted that the configuration shown in the figures is a schematic view and that the person skilled in the art can provide various variants by modifying the device for attaching the watch band to the watch case and/or by designing a watch band in a configuration that frees the region around the direction of the normal vector 22. It will be observed that an abovementioned angular displacement of the normal vector 22 upwards allows the zone generally occupied by the watch band, which must be freed to allow the infrared radiation to be received with a relatively large opening, to be made smaller. The positioning of the sensor 18 in a region of the case 4 located in the extension of the '12 h' position of the dial is selected so as to allow measurements of the infrared radiation to be performed in the preferred directions when the wristwatch 2 is worn on the wrist of a user. In fact, the orientation of the normal vector to the sensor 18 means that detection of a radiation coming from the wearer of the watch can be prevented in the majority of positions of the forearm of this person. Then, in a seated position of the wearer the direction of orientation of this sensor is generally below a horizontal plane, which enables measurements that are largely oriented downwards to be performed automatically and prevents outside measurements oriented towards the sky, for reasons already explained in the summary of the invention. This is also partially true when the wearer is standing, wherein this direction of orientation, although close, is primarily below a horizontal plane and is moving away from the body of the wearer. However, in seated position it is possible that the direction of orientation points towards a leg of the wearer. In this case, a filter can be provided to eliminate parasitic measurements, as still to be explained below.

The infrared sensor 18 is electrically connected to an electronic unit 30 via a flexible substrate 32 having electric conductor tracks and a circuit connector 34 connecting at least one zone of the flexible substrate to at least one respective zone of a printed circuit 36, on which the electronic unit 30 is arranged. This electronic unit forms a control circuit of the infrared sensor and a circuit for processing measurement signals supplied by this infrared sensor. In an ambient temperature measurement mode the control circuit is arranged to enable the infrared sensor to be activated multiple times so that this sensor can provide a plurality of measurement signals over a certain period of time. Then, in this ambient temperature measurement mode the processing circuit is arranged to supply temperature values corresponding to at least a portion of the plurality of measurement signals and to take a mean for at least a portion of these temperature values to obtain an average temperature value that is considered to be representative of the ambient temperature.

It will be noted that in one variant the control circuit and the processing circuit can be formed by separate specific circuits. It will also be noted that at least a portion of the control circuit and/or the processing circuit can be incorporated into the measurement unit 16 and even into the infrared sensor designed specifically for the present application. Various levels of integration of the electronic circuits are therefore conceivable. In a known manner a temperature sensor is incorporated into the measurement unit 16 to increase the precision of the measurement of the infrared radiation by the sensor 18, given that the measurement signal that it produces is dependent on its temperature.

As the ambient temperature in a space largely in thermal equilibrium corresponds sufficiently precisely to an average temperature of the radiating surfaces that delimit this space and of objects located in this space, it is provided in a variant that the measurement unit 16 and the infrared sensor 18 therein are arranged so that in the ambient temperature measurement mode this sensor receives an infrared radiation from outside the wearable device over an aperture angle of at least twenty degrees (20°) at least in a given geometric plane. Thus, the aperture α in the general plane of the watch case and/or the aperture β in the transverse plane to this general plane and comprising the axis 26 have a value of at least 20°. In another preferred variant this aperture has a value of at least thirty five degrees (35°) at least in a given geometric plane. It will be noted that the infrared sensors used for measuring the temperature of an object generally have a relatively small aperture in order to receive the infrared radiation coming solely from this object. In contrast, in the variants described here a relatively large aperture is provided so that the temperature obtained for each measurement already corresponds to a certain mean of the temperatures of various surfaces and/or objects.

In a particular variant the processing circuit 30 comprises a filter arranged to eliminate certain signals from among a plurality of measurement signals supplied by the infrared sensor in a given period, or certain values from among the corresponding temperature values. More particularly, this filter eliminates at least measurement signals or temperature values that are located outside a determined range. In a variant this range is determined as a function of previous measurements and in particular of a mean of these previous measurements and a predefined or calculated standard deviation. This enables measurements to be eliminated that would come, for example, from a heat source or certain materials that readily accumulate solar radiation, e.g. certain tars outside in sunny weather with no wind.

According to a preferred embodiment, in particular for a measurement of ambient temperature outside, also described on the basis of FIG. 2, the wearable device comprises a inclinometer 40. This inclinometer is arranged to measure an angle between a terrestrial reference direction and an orientation direction of the infrared sensor. In the ambient temperature measurement mode the control circuit of the infrared sensor is arranged to activate it when this orientation direction is located in a certain angular space. Alternatively, it is the circuit for processing measurement signals that is arranged to exclude a measurement signal received from the infrared sensor when the orientation direction is located outside a certain angular space. In a preferred variant the terrestrial reference direction is a vertical axis and the abovementioned orientation direction is defined by the vector 22 normal to the active surface of the infrared sensor 18. Moreover, the angular space selected is defined by a right circular cone that has this vertical axis as centre axis, its vertex being located at the top of this cone, i.e. it is not an inverted cone.

This preferred embodiment is highly advantageous for measurements outside, since measurements with the sensor oriented in a direction above the horizontal plane, which have a high probability of being completely erroneous as they come from celestial radiation, can thus be excluded. In a variant it is possible to define another angular space, in particular in order to exclude measurements that could be influenced by the body temperature of the user or wearer of the wristwatch 2. In a known manner, the inclinometer can be formed by a three-axis accelerometer that allows the vertical direction to be precisely determined and the orientation in the space to thus be given in three dimensions for each reference axis of the wearer device, in particular axis 26, since this inclinometer is integral to the wearable device.

In a particular variant the wearable device comprises means for weighting the temperature values determined by the processing circuit as a function of the orientation directions of the infrared sensor measured by the inclinometer during corresponding measurements of the infrared radiation by this infrared sensor. In this case, the mean defining the ambient temperature is a weighted mean.

FIG. 3 is a plan view of a particular embodiment of a wristwatch 42 according to the invention. The infrared sensor 18 is shown in this plan view so that its arrangement in the watch case 4A may be understood, but it is in fact located inside this case. The references already described will not be described again here. This wristwatch differs by virtue of a particular arrangement of the infrared sensor 18 in the case 4A, i.e. that the vector 22A normal to its active surface exits from a lateral edge 48 of the case. In the example shown in FIG. 3, the lateral recess in the case for the arrangement of the infrared radiation measurement unit is partially provided in a horn 50. This aperture is closed by a side wall 29 forming a window that is substantially transparent for IR radiation. In a variant the normal vector 22A has a first angle relative to the general plane of the case, in the direction towards the top of the case (i.e. upwards in the direction of the watch glass covering the display 12), which is less than thirty degrees (30°). Then, a second angle $\theta$ of this normal vector relative to the plane perpendicular to this general plane and comprising the '6 h-12 h' axis 26 is more than twenty degrees (20°) and less than sixty degrees (60°) in clockwise direction. Such an arrangement is favourable because it firstly enables the watch to be fitted with a classic watch band 10A with an attachment to the case formed by a pin between two horns. Then, this arrangement ensures that the major portion of the measurements conducted by the infrared sensor when the watch is worn on the wrist of this user correspond to orientation directions of the sensor below a horizontal plane, in particular when the user is standing.

The present invention also relates to a method for measuring the ambient temperature by means of an infrared sensor incorporated into a wearable device. Since this method is implemented in particular by the wearable device according to the invention, features of this wearable device explained above are provided for implementation of different variants of the method according to the invention. Unnecessary repetitions will thus be avoided in the description of this method.

In general, the method for measuring the ambient temperature by means of an infrared sensor incorporated into a wearable device is characterised in that it comprises the following steps:

A) Performing multiple measurements of the infrared radiation from outside the wearable device, which impinges on the active surface of the infrared sensor, over a certain period of time by moving the wearable device, wherein the infrared sensor transmits a plurality of measurement signals to a circuit for processing these measurement signals;

B) Supplying, by means of the processing circuit, temperature values corresponding to at least a portion of the plurality of the measurement signals;

C) Taking a mean for at least a portion of said temperature values to obtain an average temperature value, which is considered to be representative of the ambient temperature.

In a preferred variant the plurality of measurements provided in step A) are conducted in succession at substantially regular intervals. In a preferred practical example of the method for measuring the ambient temperature it is provided that an angle is measured between a terrestrial reference direction and an orientation direction of the infrared sensor during each envisaged measurement by means of an inclinometer incorporated into the wearable device. Using this angle measurement, either the control circuit of the infrared sensor activates it only when the orientation direction is located in a certain angular space, or the circuit for processing measurement signals excludes a measurement signal received from the infrared sensor when the orientation direction is located outside this angular space. In a preferred variant the terrestrial reference direction is a vertical axis and the orientation direction is defined by a vector normal to its active surface. The angular space is defined by a right circular cone that has this vertical axis as centre axis, its vertex being located at the top of this cone.

According to a particular variant the method comprises a step of weighting the temperature values as a function of angles measured by the inclinometer during corresponding measurements by the infrared sensor.

According to a particular practical example the method is characterised in that the control circuit activates the infrared sensor to supply a new measurement signal only when it determines that the orientation direction of the infrared sensor has changed substantially compared to a last measurement or to last measurements. Alternatively, the circuit for processing measurement signals takes the provided mean by selecting temperature values, of which at least a portion corresponds to substantially different orientation directions.

According to another particular practical example where it is provided that the wearable device is worn on the wrist of a user, the method for measuring the ambient temperature according to the invention is automatically repeated periodically when the ambient temperature measurement function is active. This allows a new measurement of the ambient temperature to be conducted regularly without the user of the wearable device, in particular the wristwatch, having to adopt any specific behaviour. Hence, the display of the ambient temperature is updated automatically and thus remains precise. This display can be permanent and the ambient temperature measurement mode can be continuous or periodic. The display of the ambient temperature can also be provided on request. By virtue of the latter practical example it is possible to quickly display a correct value for the ambient temperature.

While the present invention presents a particularly favourable application for a wearable device on the wrist of a user, it can also be implemented in other devices, e.g. in mobile telephones or electronic tablets.

What is claimed is:

1. A wearable device comprising:
    a temperature measurement device to measure an ambient temperature, wherein the temperature measurement device includes:
        an infrared sensor,
        a control circuit connected to the infrared sensor, and
        a processing circuit connected to the infrared sensor and configured to process measurement signals supplied by the infrared sensor, wherein
    in an ambient temperature measurement mode, the infrared sensor is to receive an infrared radiation from at least one object and/or surface that is outside of and not a part of the wearable device; wherein
    in said ambient temperature measurement mode, the control circuit is configured to activate the infrared sensor several times so that the infrared sensor supplies a plurality of measurement signals over a certain period of time; wherein
    in the ambient temperature measurement mode, the processing circuit is configured to supply temperature values corresponding to at least a portion of said plurality of measurement signals, and to take a mean of at least a portion of the temperature values to obtain an average temperature value that is representative of the ambient temperature; and wherein
    in said ambient temperature measurement mode, said infrared sensor is to receive said outside infrared radiation over an aperture angle of at least twenty degrees at least in a given geometric plane.

2. The wearable device according to claim 1, wherein in said ambient temperature measurement mode, said infrared sensor is to receive said outside infrared radiation over the aperture angle of at least thirty five degrees at least in the given geometric plane.

3. The wearable device according to claim 1, wherein said processing circuit comprises a filter to eliminate certain signals from among said plurality of measurement signals or certain values from among said temperature values, wherein the filter eliminates at least measurement signals or temperature values that are located outside a determined range.

4. The wearable device according to claim 1, wherein the wearable device further comprises an inclinometer, which is to measure an angle between a terrestrial reference direction and an orientation direction of said infrared sensor; and wherein
    in said ambient temperature measurement mode, either said control circuit is configured to activate the infrared sensor only when said measured orientation direction is located in a certain angular space, or said processing circuit is configured to exclude a measurement signal received from the infrared sensor when said measured orientation direction is located outside said angular space.

5. The wearable device according to claim 4, wherein the terrestrial reference direction is a vertical axis and the orientation direction is defined by a vector normal to an active surface of the infrared sensor; and wherein
    said angular space is defined by a right circular cone that has the vertical axis as a center axis, a vertex being located at a top of the cone.

6. The wearable device according to claim 4, wherein the processing circuit is configured to weight said temperature values as a function of angles measured by said inclinometer during corresponding measurements by the infrared sensor.

7. The wearable device according to claim 1, wherein the wearable device is to be worn on a wrist of a user.

8. The wearable device according to claim 7, wherein the wearable device forms a wristwatch, and wherein
    said infrared sensor is arranged in a case of the wristwatch with a vector normal to an active surface of the infrared sensor largely located in a plane comprising a '6 h-12 h' axis and perpendicular to a general plane of the case, wherein said normal vector is oriented in a '12 h' direction relative to a center of the case and has an angular displacement relative to said '6 h-12 h' axis of less than thirty degrees.

9. The wearable device according to claim 8, wherein said infrared sensor is arranged in a lateral recess of the case, wherein the lateral recess is closed on an external side by a lug or a wall that is largely transparent to the infrared radiation.

10. The wearable device according to claim 7, wherein the wearable device forms a wristwatch, and wherein
    said infrared sensor is arranged in a case of the wristwatch with a vector normal to an active surface of the infrared sensor exiting from one of two lateral edges of the case, wherein the normal vector has a first angle relative to a general plane of the case, which is less than thirty degrees, and a second angle relative to a plane perpendicular to the general plane and comprising a '6 h-12 h' axis in a clockwise direction that is more than twenty degrees and less than sixty degrees.

11. The wearable device according to claim 10, wherein said infrared sensor is arranged in a lateral recess of the case, wherein the lateral recess is closed on an external side by a lug or a wall that is largely transparent to the infrared radiation.

12. A method for measuring an ambient temperature by the infrared sensor incorporated into the wearable device according to claim 1, wherein the method comprises:
performing multiple measurements of the infrared radiation from the at least one object and/or surface that is outside of and not a part of the wearable device, which impinges on an active surface of the infrared sensor, over the certain period of time by moving the wearable device, wherein the infrared sensor transmits the plurality of measurement signals to the processing circuit configured to process the measurement signals;
supplying, by said processing circuit, the temperature values corresponding to the at least a portion of said plurality of measurement signals; and
taking the mean of the at least a portion of said temperature values to obtain the average temperature value, which is representative of the ambient temperature, wherein
the infrared sensor is to receive the infrared radiation from outside the wearable device over the aperture angle of at least twenty degrees at least in the given geometric plane.

13. The method according to claim 12, wherein the infrared sensor is to receive the infrared radiation from outside the wearable device over the aperture angle of at least thirty five degrees at least in the given geometric plane.

14. The method according to claim 12, wherein the method further comprises eliminating measurement signals or temperature values located outside a determined range.

15. The method according to claim 12, wherein the method further comprises measuring, by an inclinometer, which is incorporated into the wearable device, an angle between a terrestrial reference direction and an orientation direction of the infrared sensor; and
activating, by the control circuit of the infrared sensor, the infrared sensor only when the orientation direction is located in an certain angular space, or excluding, by said processing circuit, a measurement signal received from the infrared sensor when the orientation direction during a corresponding measurement is located outside the angular space.

16. The method according to claim 15, wherein the terrestrial reference direction is a vertical axis and the orientation direction of the infrared sensor is defined by a vector normal to an active surface; and wherein
said angular space is defined by a right circular cone that has the vertical axis as a center axis, a vertex being located at a top of the cone.

17. The method according to claim 15, wherein the method further comprises weighting said temperature values as a function of angles measured by said inclinometer during corresponding measurements by the infrared sensor.

18. The method according to claim 15, wherein the method further comprises activating, by said control circuit, said infrared sensor to supply a new measurement signal only when the control circuit determines that the orientation direction of the infrared sensor has changed substantially compared to a last measurement or to last measurements, or taking, by said processing circuit, said mean by selecting temperature values, of which at least a portion corresponds to substantially different orientation directions.

19. The method according to claim 15, wherein the wearable device is to be worn on a wrist of a user; and wherein
when an ambient temperature measurement function is active the method for measuring the ambient temperature is automatically repeated periodically.

20. The method according to claim 12, wherein the wearable device is to be worn on a wrist of a user; and wherein
when an ambient temperature measurement function is active the method for measuring the ambient temperature is automatically repeated periodically.

21. The wearable device according to claim 1, wherein the infrared sensor is permanently unobstructed from receiving the infrared radiation from the at least one object and/or surface that is outside of and not a part of the wearable device.

22. A wearable device comprising:
a temperature measurement device to measure an ambient temperature, wherein the temperature measurement device includes:
an infrared sensor,
a control circuit connected to the infrared sensor, and
a processing circuit connected to the infrared sensor and configured to process measurement signals supplied by the infrared sensor, wherein
in an ambient temperature measurement mode, the infrared sensor is to receive an infrared radiation from at least one object and/or surface that is outside of and not a part of the wearable device; wherein
in said ambient temperature measurement mode, the control circuit is configured to activate the infrared sensor several times so that the infrared sensor supplies a plurality of measurement signals over a certain period of time; wherein
in the ambient temperature measurement mode, the processing circuit is configured to supply temperature values corresponding to at least a portion of said plurality of measurement signals, and to take a mean of at least a portion of the temperature values to obtain an average temperature value that is representative of the ambient temperature; wherein
the wearable device further comprises an inclinometer, which is to measure an angle between a terrestrial reference direction and an orientation direction of said infrared sensor; and wherein
in said ambient temperature measurement mode, either said control circuit is configured to activate the infrared sensor only when said measured orientation direction is located in a certain angular space, or said processing circuit is configured to exclude a measurement signal received from the infrared sensor when said measured orientation direction is located outside said angular space.

* * * * *